United States Patent [19]

Bush et al.

[11] 3,730,541

[45] May 1, 1973

[54] FLUID PRESSURE BRAKE SYSTEM

[75] Inventors: John W. Bush, Mt. Clemens; Andrew E. Cunningham, Detroit, both of Mich.

[73] Assignee: Borg-Warner Corporation, Chicago, Ill.

[22] Filed: June 2, 1972

[21] Appl. No.: 259,054

[52] U.S. Cl...............................303/21 F, 188/181 A
[51] Int. Cl................................................B60t 8/06
[58] Field of Search......................303/21 CG, 21 F, 303/21 R, 21 CE; 188/181 A

[56] References Cited
UNITED STATES PATENTS

| 3,411,835 | 11/1968 | Davis | 303/21 F |
| 3,608,982 | 9/1971 | Inada et al. | 188/181 A |
| 3,610,701 | 10/1971 | Riordan | 188/181 A |

*Primary Examiner*—M. Henson Wood, Jr.
*Assistant Examiner*—John J. Love
*Attorney*—Donald W. Banner et al.

[57] ABSTRACT

A fluid pressure brake system includes wheel slip control means which provides for reducing the braking pressure in steps in order to conserve fluid while alleviating a locked wheel condition.

3 Claims, 2 Drawing Figures

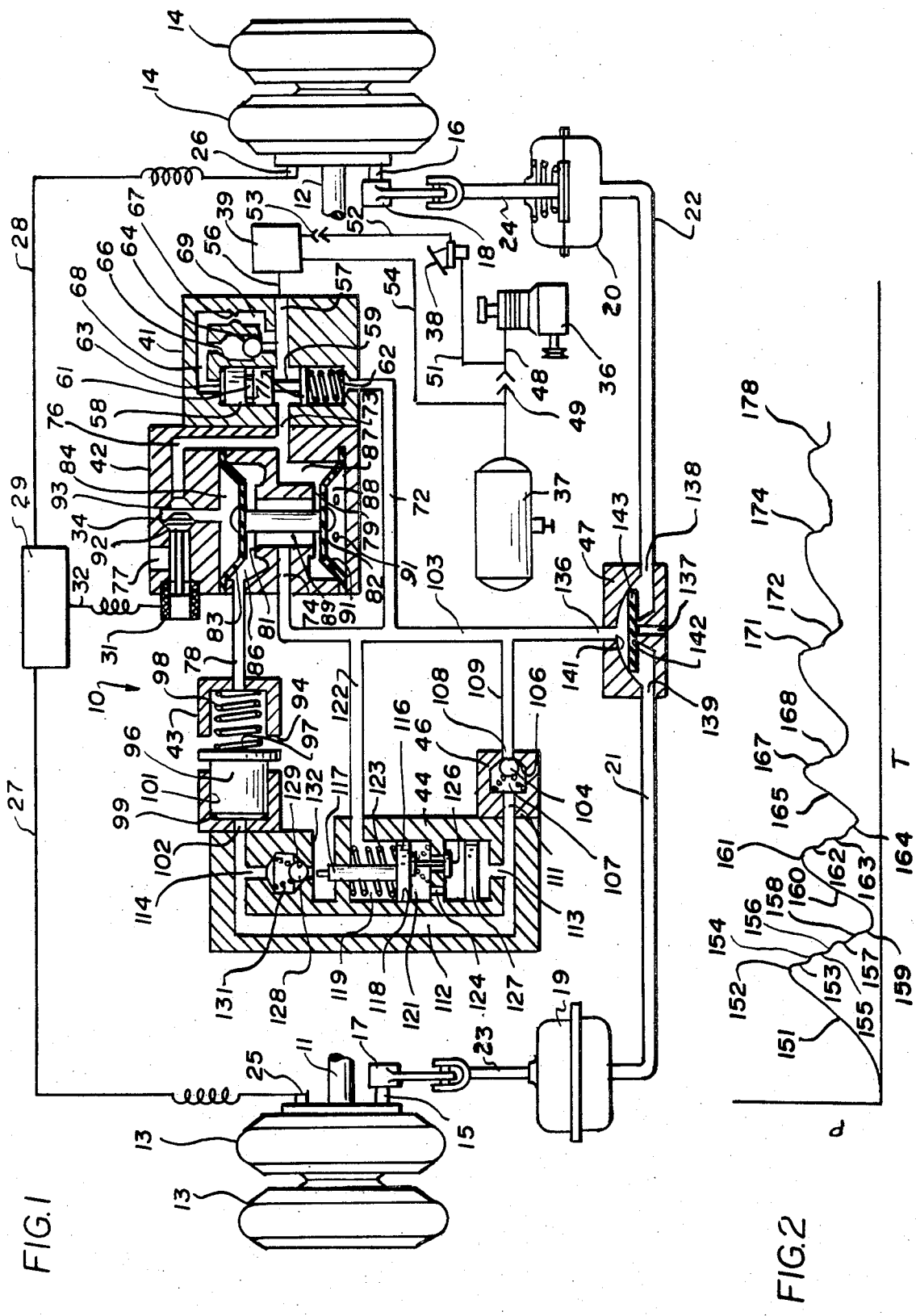

FLUID PRESSURE BRAKE SYSTEM

BACKGROUND OF THE INVENTION

1. Field of the Invention

The invention relates generally to pneumatic brake systems and more particularly to a brake system in which the braking pressure is regulated to alleviate a locked wheel condition.

2. Description of the Prior Art

Brake systems have been proposed in which air is released from the brake circuit in response to an impending locked wheel condition to prevent the loss of lateral stability. Such brake systems often employ a pressure tank as a source of compressed air for applying the brakes. An objection to prior brake systems arises when repeated dumping of the brake pressure results in depletion of the pressurized reservoir of air.

SUMMARY OF THE INVENTION

It is an object of the present invention to provide a wheel slip control brake system in which the braking pressure is relieved in steps in order to conserve reservoir pressure while correcting for a locking or locked wheel condition. Other objects and advantages of the invention will become apparent from consideration of the accompanying drawing and the following description.

BRIEF DESCRIPTION OF THE DRAWING

FIG. 1 is a schematic view of a brake system according to the present invention; and FIG. 2 is a pressure-time diagram illustrating brake pressure release cycles as provided by the system shown in FIG. 1.

DETAILED DESCRIPTION OF THE INVENTION

The reference character 10 generally indicates a pneumatic braking system for a vehicle. Axles 11, 12 are mounted on the vehicle and have wheels 13, 14 mounted thereon including braking apparatus. One well known form of braking apparatus employs shafts 15, 16 which are rotatable for applying a braking force to the wheels by means of external linkages such as slack adjusters 17, 18. A pair of brake actuators 19, 20 are mounted on the vehicle and connected to a pain of air passages 21, 22 forming part of a brake actuator circuit. Rods 23, 24 extend from respective actuators 19, 20 and are connected to respective slack adjusters 17, 18 for applying the brakes in response to pressure in the actuators. The braking system and apparatus may be modified as required for use with the front or rear wheels of a truck or tractor or on a trailer. The wheels are provided with monitoring devices 25, 26 capable of providing wheel speed information to a logic module 29 by means of connections 27, 28. The logic module 29 is preferably of an electronic type in which wheel speed signals are processed for determining the deceleration of the wheel. When excessive braking force which would result in lock up is applied to the wheels, the logic module detects a threshold wheel deceleration level and supplies current to solenoid 31 through connection 32 for operating a valve 34. While the above form of skid detecting apparatus is preferred, alternative forms of apparatus capable of displacing a valve in response to excessive braking force may be employed if desired.

The braking system, as shown, includes a compressor 36, one or more tanks 37 an operator control valve 38, a relay valve 39, a flow control valve 41, a shuttle valve 42, a pressure regulated exhaust valve 43, a time delay pressure relief valve 44, a charging valve 46, and a quick release valve 47. It is contemplated that each vehicle would be provided with an engine driven compressor 36 and one or more operator control valves 38 such as a treadle and lever valves. Portions of the system would be duplicated for each braked wheel of the vehicle in a wheel by wheel configuration, or for each braked axle of the vehicle in an axle by axle configuration. In the drawing, a circuit for one axle of an axle by axle configuration is illustrated.

The compressor 36 is connected to each air tank or reservoir 37 by a connecting line 48 such as metal tubing or flexible hose, and may include a coupling member 49 where the tank is located on a trailer. The compressor 36 is connected to operator control valve 38 by means of a line 51, while the operator control valve is connected to relay valve 39 by line 52 which may include a coupler 53 when the braked axle is located on a trailer. In an axle by axle configuration, it is contemplated that the compressor and operator control valve would be connected to additional reservoirs and relay valves for simultaneous operation of the brakes on the various axles of the vehicle.

Tank 37 and relay valve 39 are located on the vehicle as close as practical to brake actuators 19, 20 and are connected to each other by a line 54. Relay valve 39 is a normally closed pilot operated modulating valve which is capable of having its outlet port 56 connected with line 54 and tank 37 in response to a pressure signal from operator control valve 38. Thus the operator control valve may be located in the cab of a tractor while the tank and relay valve may be located near an axle of a trailer.

Flow control valve 41 includes a passage 57 intercepted by a movable spool 58 having a free flow portion 59 and a restricted flow portion 61. The spool 58 is normally biased by a spring 62 to a first position in which the free flow portion 59 intercepts passage 57. One end of the spool 63 is connected to inlet passage 57 by means of a check valve 64, 66, an orifice 67, and passages 68, 69. The other end 71 of spool 58 is connected to the brake actuator circuit by a passage 72.

Shuttle valve 42 includes an inlet passage 73, an outlet passage 74, a pilot passage 76, an exhaust port 77, an exhaust passage 78, a pair of valve seats 79, 81, and a pair of diaphragms 82, 83. The diaphragms and valve seats define an upper chamber 84, an exhaust chamber 86, an entrance chamber 87, a lower chamber 88, and an outlet chamber 89. The lower diaphragm 82 includes a series of apertures 91 providing communication between entrance chamber 87 and lower chamber 88. Pilot passage 76 includes a pair of valve seats 92, 93 cooperating with solenoid valve 34.

The exhaust passage 78 of shuttle valve 42 is connected to pressure regulated exhaust valve 43. Exhaust valve 43 includes an annular seat 94, and a piston member 96 having a face 97 arranged for moving toward and from sealing engagement with annular seat 94. A spring 98 may be employed for biasing face 97 away from seat 94. The end portion 99 of piston 96 which is remote from face 97 is received in a chamber 101 connected to a passage 102.

The effective areas of piston portion 99 and face 97 are selected in combination with the preload of spring 98 if the biasing spring is included, such that the pressure in passage 102 must be greater than the pressure in passage 78 in order to hold face 97 in sealing engagement with seat 94. As indicated in the drawing, the effective areas of piston portion 99 and face 97 are substantially equal, the preload of spring 98 providing a differential force for moving face 97 away from seat 94 in order to reduce pressure in passage 78 below the pressure in passage 102.

Outlet passage 74 of shuttle valve 42 is connected to passages 103, 21 and 22 forming the actuator circuit for supplying air under pressure to the actuators 19 and 20.

Charging valve 46 includes a valve member 104 biased against seat 106 by a spring 107. The inlet port 108 of charging valve 46 is connected to passage 103 of the actuator circuit by a branch passage 109. The outlet port 111 of charging valve 46 is connected to a pilot circuit 112. Charging valve 46 is a one-way device which permits charging pilot circuit 112 from actuator circuit passages 109 and 103.

Pilot circuit 112 is connected to passage 102 of pressure regulated exhaust valve 43 and to ports 113, 114 of time delay relief valve 44.

Relief valve 44 includes a piston and plunger member 116, 117 movable within a cavity 118. The piston portion 116 divides cavity 118 into a first variable volume chamber 119 and a second variable volume chamber 121. First chamber 119 is connected by means of branch passage 122 for receiving pressure from actuator circuit 103. While not essential to the operation of the valve, a biasing spring 123 may be included in first chamber 119 for urging piston and plunger 116, 117 to a reset position in the absence of pressure in the system.

Second variable volume chamber 121 is connected by means of an orifice 124 and check valve 126 for receiving pressure from pilot circuit 112 through port 113. As shown in the drawing, a movable baffle plate 127 may be employed, if desired, between the orifice 124 and port 113 in order to permit the use of a fluid other than system compressed air in the second chamber 121. Though not essential, it is nevertheless desirable to use an intermediate fluid in order to avoid obstruction of orifice 124 by contaminating particles which may be present in the air supply. Where an intermediate fluid is employed, the viscosity of the fluid is selected in combination with the orifice size to provide the desired time delay for movement of piston plunger members 116, 117.

Relief valve 44 also includes a valve member 128 normally urged against a seat 129 by a spring 131. The seat 129 is in communication with pilot circuit 112 through port 114 and is in communication with atmosphere through port 132. Member 128 and plunger 117 are mounted such that the valve member is unseated to connect the pilot circuit to atmosphere after piston 116 has moved a predetermined distance from its reset position.

While not essential to the operation of the system it is desirable to employ a quick release valve in the actuator circuit in order that the brake actuator may respond quickly to changes in pressure. One form of quick release valve 47 is illustrated as having an inlet port 136, and outlet port 137 and brake ports 138, 139. Inlet seat 141 and outlet seat 142 are formed adjacent inlet port 136 and outlet port 137. A flexible disc 143 is mounted so as to normally engage a portion of both seats 141 and 142. The flexural properties of disc 143 are such that it assumes a dished configuration when pressure differentials occur between passage 103 and passages 21, 22. When pressure in passage 103 exceeds pressure in passages 21 or 22, the middle of the disc is urged firmly against outlet seat 142 to seal outlet port 137, while the edge of the disc is deflected to permit the flow of air from passage 103 to passages 21 and 22. When the pressure in passages 21, 22 exceeds the pressure in passage 103, the middle portion of the disc is moved away from outlet seat 142 and urged against inlet seat 141 connecting passages 21, 22 with atmosphere through outlet port 137. As illustrated, quick release valve 47 includes a pair of brake ports 138, 139 for controlling the pressure applied to a pair of actuators in an axle by axle configuration. If it is desired to control the braking pressure of additional wheels, the quick release valve can be provided with additional brake ports. On the other hand, where a wheel by wheel configuration is employed, the quick release valve would be provided with a single brake port inasmuch as the slip control apparatus would be duplicated for each wheel.

OPERATION OF THE BRAKING SYSTEM

The operation of the components in the above described system will be described in sequence, however, it is to be understood that some of the operations occur simultaneously.

Typically, the operator applies the brakes by actuation of the operator's control valve 38 which provides a pressure signal to relay valve 39, conditioning the relay valve to connect compressed air tank 37 to passage 57 of flow control valve 41 through the line 54 54 and outlet port 56.

Pressure in passage 57 moves check valve 64 against seat 66 such that air is required to bleed slowly through the orifice 67 in order to reach the end 63 of spool 58. The pressure in passage 57 is communicated to inlet passage 73 and pilot passage 76 of shuttle valve 42. The pressure in inlet passage 73 appears in chambers 87, 88 and outlet passage 74. Pressure in pilot passage 76 enters upper chamber 84 deflecting upper diaphragm 83 into sealing engagement with seat 81, closing exhaust chamber 86.

Pressure in outlet passage 74 is communicated to actuator circuit passages 103, 21, 22 and branch passages 72, 109 and 122. Pressure in passages 21,22 operate the actuators 19, 20 to apply the brakes through the rods 23, 24, slack adjustors 17, 18 and shafts 15, 16.

Pressure in branch passage 72 is applied to the other end 71 of spool 58 of flow control valve 41 which balances the pressures on the spool so that the spool remains in a position in which the free flow portion 59 intercepts passage 57.

Pressure in branch conduit 122 enters chamber 119 and acts on piston 116 to retain the piston and plunger 117 in the reset position away from valve member 128.

Pressure in branch passage 109 enters pilot circuit 112 through charging valve 46 and exerts a closing force on piston 96 of exhaust valve 43. Pressure in pilot circuit 112 is exerted on piston 116 through baffle 127 and the intermediate fluid in chamber 121.

Thus during an initial application of the brakes a reference pressure substantially equal to actuator pressure is trapped in pilot circuit 112 between chamber 101 of exhaust valve 43 and the charging valve 46. The reference pressure holds the face 97 against seat 94 of exhaust valve 43. The piston and plunger 116, 117 are held in a reset position away from member 128 by the substantially equal reference pressure and actuator pressure in chambers 121 and 119.

During the initial actuation of the brakes, the monitoring devices 25, 26 and logic module 29 determine whether an excess braking force has been applied which would result in a locked wheel condition. If excess braking force has been applied, solenoid 31 is energized by the module 29 through connection 32 which moves valve 34 away from seat 92 and into sealing engagement with seat 93 of shuttle valve 42.

When valve 34 engages seat 93, pilot passage 76 is closed and upper chamber 84 is opened to atmosphere through exhaust port 77. The actuator pressure present in passages 103 and 74 acts on the diaphragm 83 moving it away from seat 81, which permits communication of passage 74 with exhaust passage 78. At the same time, diaphragm 82 is moved into sealing engagement with seat 79. The pressure from relay valve 39 remains in entrance chamber 87 and lower chamber 88 thus urging diaphragm 82 against seat 79 and isolates the actuator circuit from system pressure available at the relay valve.

Exhaust passage 78 being now connected to the actuator circuit, actuator pressure is exerted on face 97 of exhaust valve 43 which together with the preload of spring 98 is sufficient to overcome the force of the reference pressure in the pilot circuit acting upon end portion 99 of piston 96. The face 97 moves away from seat 94 to reduce actuator pressure by an amount determined by the effective areas and spring preload of valve 43. The reference pressure trapped in pilot circuit 112 again moves face 97 into sealing engagement with seat 94 when the step of pressure reduction in the actuator circuit is complete. The actuator pressure is then momentarily stabilized at a lower pressure than the initially applied pressure.

During a step of pressure reduction, the pressure in the actuator circuit is decreasing while the reference pressure in the pilot circuit remains substantially constant. The reference pressure in the pilot circuit, remaining substantially constant, creates flow through orifice 124 into chamber 121 as the pressure in chamber 119 and the actuator circuit decreases, resulting in movement of piston plunger 116, 117 away from its reset position toward engagement with valve member 128. The movement of piston plunger 116, 117 toward member 128 occurs during a time interval, the duration of which is determined by the flow impedance of orifice 124. At the end of the time interval, plunger 117 engages member 128 moving it off its seat 129 such that the pilot circuit is connected to atmosphere through ports 114 and 132. The reference pressure in the pilot circuit is reduced as a result of flow to atmosphere while the member 128 is off its seat 129 and stabilizes at a new pressure level substantially equal to the momentarily held actuator pressure. The momentarily held actuator pressure acts upon charging valve 46 to recharge the pilot circuit, and acts upon piston 116 in chamber 119 to move piston plunger 116, 117 away from member 128 to its reset position permitting member 128 to reengage seat 129 trapping the second level reference pressure in the pilot circuit. The movement of piston 116 to its reset position occurs quickly as a result of check valve 126 which is in flow parallel with orifice 124. The orifice 121 and check valve 126 restrict flow into chamber 121, but permit rapid flow out of chamber 121 with the result that piston plunger 116, 117 moves slowly toward member 128 and moves rapidly away from the member to its reset position.

Once the reference pressure becomes stabilized at its second level, the pressure regulated exhaust valve 43 becomes operative to bring about a second step of pressure reduction in the actuator circuit. The second step of actuator pressure is again held momentarily for a time interval determined by movement of the piston plunger 116, 117 of delay valve 44. At the end of the time interval, the delay valve 44 and charging valve 46 establish a third level reference pressure substantially equal to the second level of actuator pressure.

The system continues with subsequent steps of actuator pressure reduction alternating with steps of reference pressure reduction as long as solenoid valve 34 is held in engagement with seat 93. When the actuator pressure reduction reaches a level sufficient to correct the excessive braking condition, the monitors 25, 26 and logic module 29 cause solenoid valve 34 to move from seat 93 and reengage seat 92. Reengagement of valve 34 with seat 92 results in movement of diaphragm 83 into sealing engagement with seat 81 isolating exhaust valve 43 from the actuator circuit thereby terminating pressure reduction in the actuator circuit. At the same time, diaphragm 82 is moved away from seat 79 reconnecting the actuator circuit with the source of braking pressure in passage 57.

During the steps of actuator pressure reduction the spool 58 of flow control valve 41 becomes unbalanced as a result of having system pressure acting upon end portion 63 while the reduced actuator pressure is exerted on end portion 71. The pressure difference causes the spool 58 to move while there is no flow occurring through passage 57 to a position in which restricted flow portion 61 intercepts passage 57. When solenoid valve 34 terminates the steps of pressure reduction and reestablishes flow through passage 57 to the actuator circuit, the flow must now act upon the restricted flow portion 61 of spool 58. The restriction to flow causes a pressure difference across the spool 58 which tends to frictionally retain the spool in its restricted flow position with respect to passage 57. The restriction to flow in passage 57 moderates the rate of pressure rise in the actuator circuit during the reapplication of system pressure to the actuator circuit.

Referring now to FIG. 2, an example of pressure changes in the actuator circuit typical of the above described apparatus is illustrated in graphical form. Line portion 151 represents the pressure rise in an actuator when the brakes are initially applied by the operator control valve. The rate of pressure rise is moderated while the compressed air fills the passages, chambers and actuators in the system. As the actuator pressure rises, the logic module signals an excessive braking condition which operates shuttle valve 42 to isolate system pressure from the actuator. The isolation of system pressure is indicated at point 152 in FIG. 2. Exhaust valve 43 then becomes operative to provide a first step of actuator pressure reduction indicated by line portion 153 which is held momentarily as indicated by line portion 154. This is followed by a second step of pressure reduction indicated at 155 which is held momentarily as indicated at 156. A third step of pressure reduction 157 is held momentarily as indicated at 158. A fourth step of reduction began as indicated at 159 but was terminated by operation of the solenoid valve and logic module which reconnected the actuator circuit to system pressure. Although the various passages and chambers of the system are filled with air when the reapplication occurs, the rate of pressure rise is moderated as indicated by line portion 160 by means of flow control valve 41.

When the reapplication of system pressure results in excessive braking, the logic module and solenoid valve condition the shuttle valve to isolate system pressure as indicated at 161. The exhaust valve then becomes operative to provide a first and second step of pressure reduction as indicated at 162 and 163. A third step of pressure reduction 164 was terminated and system pressure was reapplied as indicated by line portion 165. During the third cycle, two steps of pressure reduction occurred as indicated at 167, 168. During the fourth cycle a first step of pressure reduction 171 was completed and a second step of pressure reduction 172 was terminated. During fifth and sixth cycles single steps of pressure reduction 174 and 178 were completed.

The above described pressure changes are typical of the operation of the above described system from which it can be inferred that the system tends to seek a narrow pressure range near the level which would produce the most effective braking under a particular set of road conditions.

It is to be understood that schematic illustrations have been used in connection with the foregoing description in order to afford a ready understanding of the system and its operation. In practicing the invention, it is contemplated that the components would appear in forms consistant with recognized manufacturing practices.

What is claimed is:

1. A fluid pressure braking system for a vehicle including a source of fluid pressure, a brake actuator circuit including a pressure responsive brake actuator, and means for selectively connecting said pressure source to said actuator circuit including an operator control valve and wheel slip control apparatus for applying a braking force to said vehicle, said wheel slip control apparatus comprising:
   a shuttle valve movable for isolating said pressure source from said actuator circuit and for connecting said actuator circuit to a pressure regulated exhaust valve in response to a control signal indicating excessive braking force, said pressure regulated exhaust valve being connected to a pilot circuit and being constructed and arranged for reducing pressure in said actuator circuit by a preselected magnitude below a reference pressure in said pilot circuit,
   a charging valve connecting said actuator circuit to said pilot circuit providing a reference pressure in said pilot circuit related to pressure in said actuator circuit, and
   a time delay pressure relief valve connected to said pilot circuit arranged for holding said reference pressure in said pilot circuit for a predetermined time interval during which said exhaust valve is operable to effect a step of pressure reduction in said actuator circuit.

2. A fluid pressure braking system according to claim 1 in which said pressure relief valve includes a pair of balance chambers and a member movable toward and from a pressure relieving position in response to pressure differences in said chambers, one of said chambers being connected for receiving pressure from said actuator circuit, and the other of said chambers being connected for receiving pressure from said pilot circuit through a restrictor providing a fluid impedance, said member being urged toward said pressure relieving position for reducing said reference pressure in said pilot circuit in response to excess pressure in said other chamber, and being movable from said pressure relieving position for terminating reduction of said reference pressure in response to excess pressure in said one chamber.

3. A fluid pressure braking system according to claim 2, in which said relief valve has a one-way valve connected in flow parallel with said fluid restrictor for resetting said relief valve when the instantaneous pressure in said actuator circuit exceeds the pressure in said pilot control circuit.

* * * * *